(12) United States Patent
Temblador et al.

(10) Patent No.: US 9,040,825 B2
(45) Date of Patent: May 26, 2015

(54) CONDUCTORS AND METAL-COVERED CABLE WITH CODED INFORMATION AND METHOD OF APPLYING CODED INFORMATION

(75) Inventors: Richard Temblador, Carrollton, GA (US); Charles L. Holcombe, Newnan, GA (US); Allan W. Daniel, Woodland, AL (US)

(73) Assignee: Southwire Company, LLC, Carrollton, GA (US)

( * ) Notice: Subject to any disclaimer, the term of this patent is extended or adjusted under 35 U.S.C. 154(b) by 347 days.

(21) Appl. No.: 12/792,640

(22) Filed: Jun. 2, 2010

(65) Prior Publication Data

US 2011/0220386 A1 Sep. 15, 2011

Related U.S. Application Data

(63) Continuation-in-part of application No. 12/433,440, filed on Apr. 30, 2009, which is a continuation-in-part of application No. 12/269,110, filed on Nov. 12, 2008, now Pat. No. 8,234,304, which is a (Continued)

(51) Int. Cl.
*H01B 7/36* (2006.01)
*H01B 7/20* (2006.01)
*H01B 7/00* (2006.01)
*H01B 7/18* (2006.01)
*G06Q 50/04* (2012.01)
(Continued)

(52) U.S. Cl.
CPC ................ *H01B 7/365* (2013.01); *G06Q 50/04* (2013.01); *G06Q 50/06* (2013.01); *H01B 13/348* (2013.01); *H02G 3/0683* (2013.01); *H02G 2200/10* (2013.01)

(58) Field of Classification Search
CPC ....... H01B 11/1808; H01B 7/36; H01B 7/365
USPC .......... 174/102 C, 102 D, 109, 113 R, 102 R, 174/102 P, 112
See application file for complete search history.

(56) References Cited

U.S. PATENT DOCUMENTS

| 951,147 A | 3/1910 | Porter |
| 1,274,788 A | 8/1918 | Saunders |

(Continued)

FOREIGN PATENT DOCUMENTS

| DE | 409794 C | 2/1925 |
| DE | 2219612 A1 | 11/1973 |

(Continued)

OTHER PUBLICATIONS

U.S. Appl. No. 12/269,110, filed Nov. 12, 2008 entitled "Traceable and Theft Deterrent Reclaimable Product".

(Continued)

*Primary Examiner* — Timothy Thompson
*Assistant Examiner* — Sherman Ng
(74) *Attorney, Agent, or Firm* — Gardere Wynne Sewell LLP (57) ABSTRACT

A metal-clad cable assembly comprising a metal sheath disposed around a conductor assembly. The metal sheath contains spaced apart crowns and valleys defining an outer surface of the metal sheath. The cable assembly includes coded information formed within the metal sheath, the coded information providing a characteristic and/or an intended application of the metal-clad cable assembly.

27 Claims, 4 Drawing Sheets

Related U.S. Application Data continuation-in-part of application No. PCT/US2008/083217, filed on Nov. 12, 2008.

(60) Provisional application No. 60/987,566, filed on Nov. 13, 2007.

(51) Int. Cl.
*G06Q 50/06* (2012.01)
*H02G 3/06* (2006.01)
*H01B 13/34* (2006.01)

(56) References Cited

U.S. PATENT DOCUMENTS

| | | | |
|---|---|---|---|
| 1,613,858 A | | 1/1927 | Vogl |
| 2,745,436 A | | 5/1956 | Battle et al. |
| 2,867,001 A | * | 1/1959 | Lewis et al. .................. 264/167 |
| 3,197,554 A | | 7/1965 | Baker |
| 3,229,623 A | * | 1/1966 | Rubinstein et al. ............. 101/32 |
| 3,328,514 A | | 6/1967 | Cogelia |
| 3,551,542 A | * | 12/1970 | Perrone ......................... 264/166 |
| 4,029,006 A | | 6/1977 | Mercer |
| 4,216,645 A | | 8/1980 | Andersen |
| 4,368,350 A | * | 1/1983 | Perelman ................... 174/102 D |
| 4,370,542 A | | 1/1983 | Mills et al. |
| 4,997,994 A | * | 3/1991 | Andrews et al. .............. 174/112 |
| 5,001,303 A | * | 3/1991 | Coleman et al. .......... 174/102 R |
| 5,049,721 A | * | 9/1991 | Parnas et al. ............. 219/121.68 |
| 5,110,638 A | * | 5/1992 | Vogdes et al. ................ 428/35.1 |
| 5,140,319 A | | 8/1992 | Riordan |
| 5,237,917 A | | 8/1993 | Traut et al. |
| 5,280,251 A | | 1/1994 | Strangio |
| 5,289,767 A | | 3/1994 | Montalto et al. |
| 5,350,885 A | | 9/1994 | Falciglia et al. |
| 5,444,466 A | * | 8/1995 | Smyczek et al. ................... 347/4 |
| 5,474,627 A | | 12/1995 | Carriere et al. |
| 5,557,071 A | | 9/1996 | Falciglia et al. |
| 5,745,628 A | | 4/1998 | Benzel et al. |
| 5,862,774 A | | 1/1999 | Moss |
| 5,949,050 A | * | 9/1999 | Fosbenner et al. ............ 235/449 |
| 6,114,633 A | | 9/2000 | Duhancik |
| 6,293,081 B1 | | 9/2001 | Grulick et al. |
| 6,311,637 B1 | | 11/2001 | Moss |
| 6,316,730 B1 | | 11/2001 | Stelzl |
| 6,404,972 B1 | | 6/2002 | Pasch et al. |
| 6,486,395 B1 | * | 11/2002 | Temblador ...................... 174/36 |
| 6,560,390 B2 | | 5/2003 | Grulick et al. |
| RE38,345 E | * | 12/2003 | Falciglia et al. ............. 174/112 |
| 6,727,433 B2 | | 4/2004 | Tsai |
| 6,825,418 B1 | | 11/2004 | Dollins et al. |
| 6,906,264 B1 | * | 6/2005 | Grant et al. ................... 174/112 |
| 7,528,319 B2 | | 5/2009 | Kondo et al. |
| 7,991,652 B2 | | 8/2011 | Chamberlain |
| 8,234,304 B2 | | 7/2012 | Holcombe et al. |
| 8,450,612 B2 | | 5/2013 | Mcellen et al. |
| 2002/0092670 A1 | * | 7/2002 | Fang et al. .................... 174/112 |
| 2004/0024782 A1 | | 2/2004 | Chamberlain |
| 2005/0016754 A1 | * | 1/2005 | Dollins et al. ................ 174/112 |
| 2005/0040641 A1 | | 2/2005 | Cote et al. |
| 2006/0109131 A1 | | 5/2006 | Sen et al. |
| 2008/0246272 A1 | | 10/2008 | Vast et al. |
| 2008/0271919 A1 | | 11/2008 | Elko |
| 2009/0032985 A1 | | 2/2009 | Alrutz |
| 2009/0084575 A1 | | 4/2009 | Dollins et al. |
| 2009/0138514 A1 | | 5/2009 | Holcombe et al. |
| 2009/0188694 A1 | | 7/2009 | Pereira et al. |
| 2009/0242232 A1 | | 10/2009 | Holcombe et al. |
| 2010/0166374 A1 | | 7/2010 | Lapp |
| 2010/0264206 A1 | | 10/2010 | Holcombe et al. |
| 2012/0042978 A1 | | 2/2012 | Holcombe et al. |
| 2013/0062873 A1 | | 3/2013 | Holcombe et al. |
| 2014/0048607 A1 | | 2/2014 | Holcombe et al. |

FOREIGN PATENT DOCUMENTS

| | | |
|---|---|---|
| DE | 202007009370 U1 | 11/2007 |
| DE | 102009043164 A1 | 4/2010 |
| EP | 0256422 A1 | 2/1988 |
| EP | 1557846 A1 | 7/2005 |
| EP | 2096645 A1 | 9/2009 |
| EP | 2117011 A1 | 11/2009 |
| EP | 2202758 A2 | 6/2010 |
| JP | 8-190814 | 7/1996 |
| JP | 2001-335266 A | 2/2001 |
| JP | 2001035266 A | 2/2001 |
| JP | 2001-189112 A | 7/2001 |
| JP | 2004265624 A | 9/2004 |
| JP | 2006127896 A | 5/2006 |
| WO | WO-02079924 A2 | 10/2002 |
| WO | WO 2006046216 | 5/2006 |
| WO | WO-2011024144 A1 | 3/2011 |
| WO | WO-2011153303 A2 | 12/2011 |

OTHER PUBLICATIONS

U.S. Appl. No. 12/433,440, filed Apr. 30, 2009 entitled "Traceable and Theft Deterrent Reclaimable Product".

Amendment filed Nov. 29, 2011 in co-pending U.S. Appl. No. 12/269,2110.

International Search Report mailed Nov. 19, 2010 cited in Application No. PCT/US2010/032804.

Mexican Office Action dated Nov. 5, 2010 cited in Application No. MX/a/2009/013141.

Office Action dated Jan. 24, 2011 issued in U.S. Appl. No. 12/433,440.

Consumer's Energy Theft, inFocus for Employees of CMS Energy Companies, 1 page, Jan. 19, 2009.

"Copper Theft Baseline Survey of Utilities in the United States," Electrical Safety Foundation International, Jan. 2009, www.electrical.safety.org, 11 pages.

"Police, property owners employee extra measure to thwart copper thieves," OnlineAthens, Athens Banner-Herald, Jul. 11, 2011, 2 pages, http://onlineathens.com/stories/071011/new_855051647.shtml.

Electric Utilities Across the State Offer $500 Reward for Identification of Copper Thieves, A Joint News Release of Dalton Utilities, Electric Cities of Georgia and Georgia Electric Membership Corporation, Feb. 11, 2009, 2 pages.

DataDot Technology—On the cutting edge, http://web.archive.org/web/20071021130607/http://www.datadotdna.com/dtl_technology . . . , Copyright 2005, 5 pages.

Utility T&D Automation & Engineering (magazine), Shining a Light on Blackout Prevention, www.utility-automation.com, Apr. 2008, 5 pages.

Utility T&D Automation & Engineering (magazine), Wind on the Wires, www.utility-automation.com, May 2008, 2 pages.

International Search Report dated Jan. 13, 2012 cited in Application No. PCT/US2011/038857, 9 pages.

U.S. Office Action dated Aug. 19, 2011 cited in U.S. Appl. No. 12/269,110.

Mexican Second Office Action dated Jul. 8, 2011 cited in Application No. MX/a/2009/013141.

U.S. Appl. No. 13/281,489, filed Oct. 26, 2011 entitled Traceable and Theft Deterrent Reclaimable Product.

Amendment filed Apr. 19, 2011 in U.S. Appl. No. 12/433,440.

European Communication dated Mar. 16, 2011 cited in Application No. 08 850 163.0.

Preliminary Amendment filed Aug. 5, 2011 in U.S. Appl. No. 12/792,150.

U.S. Appl. No. 12/792,150, filed Jun. 2, 2010.

International Search Report dated Jan. 20, 2009 cited in International Application No. PCT/US2008/083217.

Amendment filed May 14, 2013 in U.S. Appl. No. 12/792,150, Charles Holcombe et al.

U.S. Office Action dated Jan. 14, 2013 cited in U.S. Appl. No. 12/792,150, 27 pgs.

(56) References Cited

OTHER PUBLICATIONS

NYSE Euronext, European Equities, Nexans Awarded First CORE-TAG® Anti-Theft Cable Technology Contract by SNCF for the Network of Réseau Ferré de France (RFF), ISIN #FR0000044448, Released: Nov. 26, 2012, 2 pgs.
Nexans Global Expert in Cables and Cabling Systems, "Anti-theft solutions for copper cables," May 12, 2012, 4 pgs., <http://www.nexans.com/eservice/Corporate-en/navigate_295195/Anti_theft_solutions_for_copper_cables.html>.
Office Action dated Jun. 24, 2013 issued in U.S. Appl. No. 12/792,150.
Extended European Search Report dated May 16, 2013 cited in Application No. 13158514.2, 20 pages.
Mexican Office Action and English Translation issued Mar. 15, 2013 in MX/a/2011/011522.
Office Action dated Aug. 27, 2013 in U.S. Appl. No. 12/433,440.
International Search Report dated Oct. 14, 2013 cited in Application No. PCT/US2013/054257.
U.S. Office Action dated Oct. 29, 2013 cited in U.S. Appl. No. 13/281,489.
Amendment filed Nov. 27, 2013 in U.S. Appl. No. 12/433,440.
U.S. Office Action dated Jan. 24, 2014 issued in U.S. Appl. No. 12/433,440, 10 pages.
Canadian Office Action dated Dec. 31, 2013 cited in Application No. 2,705,514, 3 pages.
Amendment filed Feb. 27, 2014 in U.S. Appl. No. 13/281,489, 11 pages.
Amendment filed Mar. 5, 2014 in U.S. Appl. No. 12/433,440, 11 pages.
Office Action in U.S. Appl. No. 12/433,440 mailed Mar. 27, 2014, 11 pages.
Office Action in U.S. Appl. No. 13/281,489 mailed Apr. 24, 2014, 18 pages.
Office Action in U.S. Appl. No. 13/658,852 mailed Jun. 3, 2014, 34 pages.
Amendment dated Jul. 29, 2014 filed in corresponding U.S. Appl. No. 12/433,440.
European Office Action dated Jun. 4, 2014 in Appl. No. 13 159 514.2-1810.
Canadian Office Action dated Sep. 2, 2014 cited in Application No. 2,705,514, 3 pgs.
Final Office Action dated Sep. 18, 2014 in U.S. Appl. No. 12/433,440, 23 pgs.

* cited by examiner

CONDUCTORS AND METAL-COVERED CABLE WITH CODED INFORMATION AND METHOD OF APPLYING CODED INFORMATION

CROSS REFERENCE TO RELATED APPLICATIONS

This application is a continuation-in-part of application Ser. No. 12/433,440, filed Apr. 30, 2009, now pending, which is a continuation-in-part of application Ser. No. 12/269,110, filed Nov. 12, 2008, now pending, which is a non-provisional of Application No. 60/987,566, filed Nov. 13, 2007. This application is also a continuation-in-part of PCT/US08/83217 filed on Nov. 12, 2008, which also claims the benefit of U.S. Application No. 60/987,566, filed Nov. 13, 2007. Each patent application identified above is incorporated here by reference in its entirety.

BACKGROUND

When manufacturing armored electrical cable, it is desirable and often necessary to apply coded information on the exterior of the armor sheath to indicate certain characteristics and/or applications of the various cables. For example, it is oftentimes necessary to readily know the number of conductors and/or the type of conductors that may be inside a particular armored electrical cable without having to locate the end of the cable or terminate the cable to enable the conductors to be visibly seen. However, the material and/or irregular surfaces of the armored cable have made it impractical to use conventional marking methods and materials to permanently and legibly apply coded information to the metallic sheath, especially at sizes that are large enough to allow the markings to be read from several feet from the cable.

Prior solutions have included color coding the armor, attaching a coded label to the armor, indenting the armor, and/or directly printing on the armor. However, color coding and printing methods result in colors or print that is susceptible to deterioration over time and in some instances, becoming unrecognizable. Printing directly on the outer surface of the metallic sheath also results in print that is sometimes unreadable due to the non-planar surface of the outer sheath. When labels are applied to the exterior of the armored cable, the labels become susceptible to damage, can get caught on and potentially tear as a result of contact with foreign objects, especially during installation. Similar to print that is applied directly to the armored cable, indicia printed onto the label is susceptible to damage, being worn away and possibly becoming unreadable. While indenting the cable can be used for permanently identifying the cable, such methods do not provide sufficient contrast to enable ease of identification and further, characters that are produced as a result of indentation, are limited in size (i.e., to the height of the metallic strip that is used to form the outer sheath). Furthermore, these solutions result in increased material costs.

SUMMARY

Embodiments disclosed herein provide an armored electrical/metal-clad cable assembly and method of manufacturing an armored electrical/metal-clad cable assembly having a conductive outer metal sheath disposed around a conductor assembly, the metal sheath having spaced apart crowns and valleys defining an outer surface of the metal sheath. The metal clad cable assembly contains coded information formed within and longitudinally along the length of the metal sheath. The coded information is used to define, for example, a characteristic and/or intended application of the metal-clad cable assembly.

Additionally, embodiments disclosed herein enable a metal-clad cable assembly to be identified by using laser etched coded information formed within the conductive outer sheath. The etching is configured to enable conductivity between the outer sheath and a connector member coupled to the electrical cable.

Embodiments disclosed herein provide a method of identifying an armored electrical cable having spaced apart crowns and valleys defining an outer surface of the electrical cable. The method includes providing a laser printing apparatus having a lens with a designated focal point length. The method further includes configuring a laser to etch coded information on the outer surface of the armored electrical cable by aligning the cable with the focal point to facilitate etching on the outer surface of the armored cable. In particular, aligning the cable with the focal point includes aligning a cable surface midpoint defined by the average midpoint distance between the crowns and valleys of the armored cable. Once aligned, the cable is properly tensioned and is fed through the laser printing apparatus such that the laser etches the coded information on the outer sheath.

For a more complete understanding of the present invention, including additional features, objects and advantages thereof, reference is now made to the following detailed description taken in conjunction with the drawings, in which:

DETAILED DESCRIPTION

In the description which follows, like parts are marked throughout the specification and drawings with the same reference numerals, respectively. The drawings may not be to scale and certain features may be shown exaggerated in scale or in somewhat schematic form in the interest of clarity and conciseness.

Figure 1:
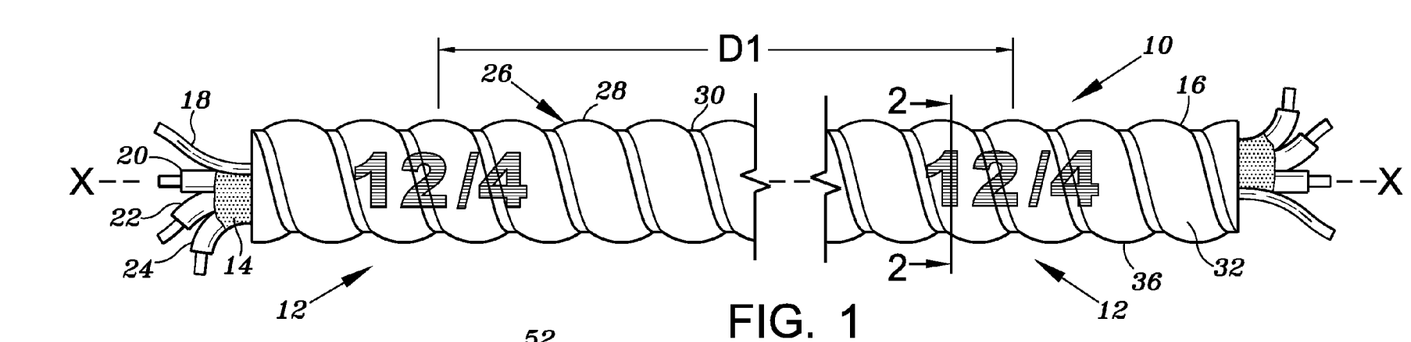
FIG. 1 is an illustration of a section of a metal-clad armored electrical cable in which coded information formed in the outer surface of the armored cable is employed to advantage to indicate one or more characteristics and/or applications of the cable.

FIG. 1 is an illustration of a metal-clad armored electrical cable 10 in which spaced apart coded information 12 is employed to advantage to indicate one or more of the characteristics and/or intended applications of cable 10. In the embodiment illustrated in FIG. 1, coded information 12 is etched and/or otherwise burned into an outer sheath 16 of cable 10 to provide permanent, indelible longitudinal markings or print on continuous length cable 10 that is easy to read and understand when viewing from a distance away from cable 10.

In the embodiment illustrated in FIG. 1, cable 10 is characterized by outer conductive sheath 16 wrapped around plural, elongated and flexible electrical conductors 18, 20, 22 and 24. In FIG. 1, a binder 14 is wrapped around conductors 20, 22 and 24 and conductor 18 is a bare grounding conductor in contact with outer sheath 16 to thereby form a low impedance ground path with outer sheath 16. However, it should be understood that a greater or fewer number of conductors can be utilized and cable 10 can be utilized without a bare grounding conductor and binder, depending on the particular application in that cable 10 is being used.

According to the illustrated embodiment, sheath 16 is formed of a metal strip having overlapping and interlocking adjacent helical convolutions, an example of which is described in U.S. Pat. No. 6,906,264, assigned to the assignee of the present application, the disclosure of which is incorporated by reference herein. For example, as best illustrated in FIG. 1, metal sheath 16 is formed of a metal strip, such as aluminum, having convolutions 26 that overlap or interlock with uniformly spaced "crowns" 28 and "valleys" 30 defining the outer surface 32 of sheath 16. However, it should be understood that metal sheath 16 may be otherwise configured, such as, for example, a welded corrugated sheath or any other type of locked or non-interlocked flexible metallic covering having a non-planar and/or otherwise non-smooth exterior surface. For example, metal sheath 16 can be a smooth metallic tube formed of copper or steel.

As illustrated in FIG. 1, coded information 12 is formed in surface 32 at spaced apart and discrete intervals "D1" along the length of cable 10 so as to assist the cable installer determining cable lengths in the field. For example, D1 may be predetermined to be 10 feet; however, it should be understood that distance D1 may be a longer or a shorter distance. Preferably and as illustrated in FIG. 1, coded information 12 extends longitudinally along the length of cable 10 parallel to an axis X-X of cable 10; however, it should be understood that coded information 12 may be otherwise formed in surface 32. For example, coded information can be formed in surface 32 to wrap/twist around cable 10 in an orientation non-parallel to axis X-X so that coded information 12 is visible regardless of the orientation of cable 10. Thus, coded information would be readily visible regardless of the orientation/twisted position of the cable 10. Preferably, coded information 12 extends a height at least half of the diameter of cable 10 so as to enable installers or anyone else handling cable 10 to easily identify a characteristic and/or intended purpose of cable 10. It should be understood, however, that the height of coded information 12 may be taller or shorter.

Figures 2, 2A:
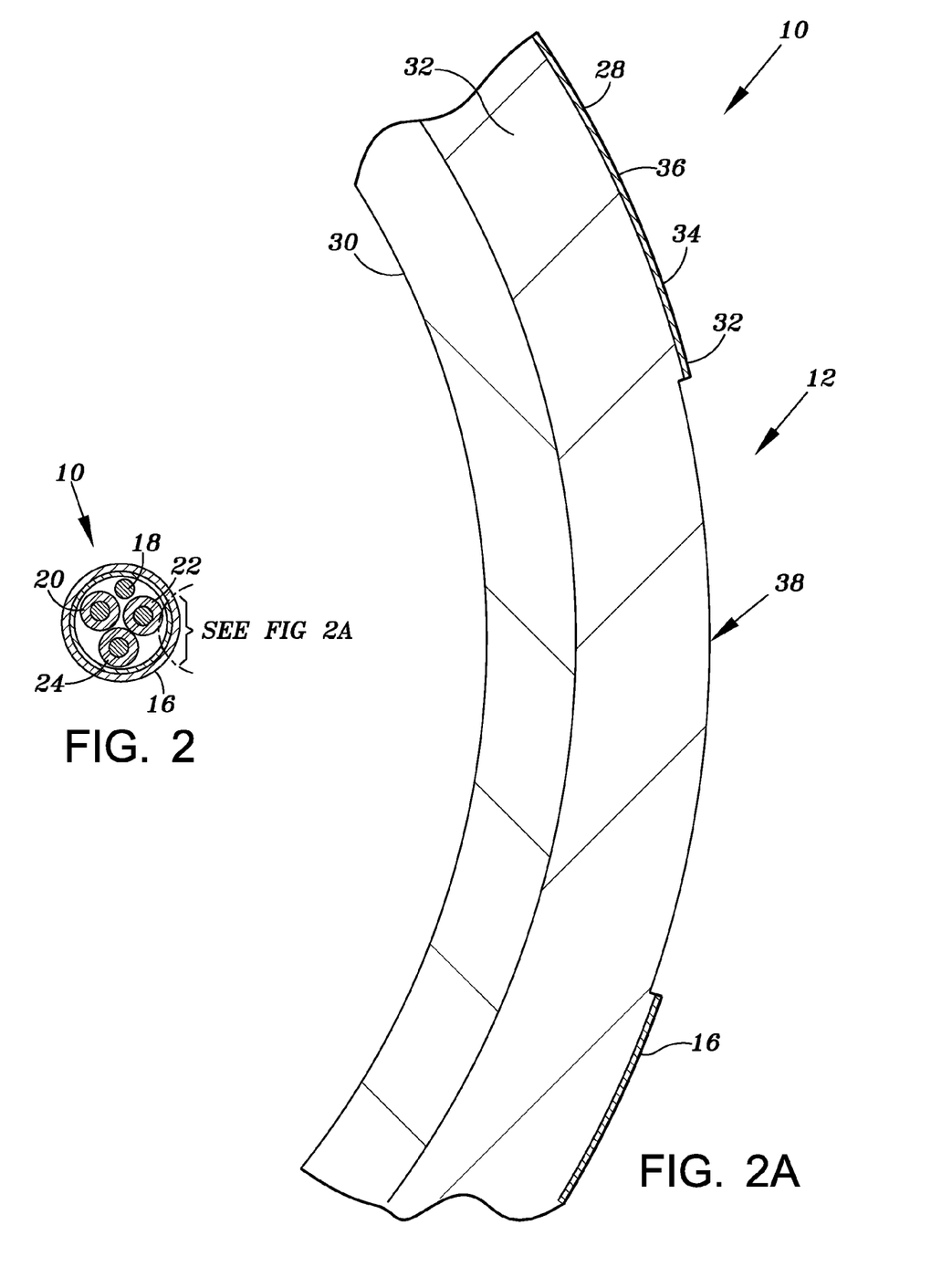
FIG. 2 is a section view of the metal-clad armored electrical cable of FIG. 1 taken along the line 2-2.
FIG. 2A is a detail view of a portion of the metal-clad armored electrical cable of FIG. 2.

Preferably, coded information 12 is formed with a laser device to etch coded information 12 into conductive sheath 16/surface 32 and/or burn off any exterior coating or top layer 34, if present on surface 32 as illustrated in (FIG. 2). In the embodiment illustrated in FIGS. 1 and 2, coating 34 may comprise, for example, a stain, an ink, an anodized coating, a thin layer of plastic, a thin polyethylene layer or any other conductive or nonconductive material.

According to some embodiments, the laser beam is configured to burn away metal (or other material) on outer sheath 16 to a desired depth forming a recessed area 38 (best illustrated in FIG. 2) to provide a long lasting marking when exposed to environment conditions. In the embodiment illustrated in FIGS. 1 and 2, the depth of coded information 12 is preferably not more than 0.001 inches so as to avoid compromising the structural integrity of cable 10 while also providing a sufficiently identifiable contrast in appearance between surface 36 and recessed area 38. According to some embodiments, recessed area 38 can be further treated to create a higher contrast between the etched portion and cable 10, which is particularly advantageous in the event cable 10 does not have a coating 34 thereon. For example, recessed area 38 forming coded information 12 may be treated with an ink or stain to distinguish coded information 12 from surface 32. Alternatively, a powder coating can be applied over the recessed area 38 forming coded information 12.

In the alternative, the marking process may only alter a surface appearance without physically removing any metal or portion of outer sheath 16. For example, the laser may be configured and/or otherwise positioned such that only coating 34 of cable 10 is removed/burned away from surface 32. Thus, in the event cable 10 contains a colored coating 34 (i.e., paint, stain, ink, etc.), the mere removal of the coating will create a defined visual contrast between surface 32 and coating 34 and thus resulting in a readily visible appearance of coded information 12. According to embodiments described herein, the above-described marking remains legible even if metal sheath 16 oxidizes. Further, the metal is less likely to be compromised if the metal is exposed to high temperatures and ultraviolet radiation.

As illustrated in the drawings, coded information 12, includes, but is not limited to, a characteristic and/or intended application of cable 10. For example, the numeric coding "12/4" etched on surface 32 indicates, in this example, that there are four conductors, as shown, of a "12 AWG" wire size or gauge. Alternatively, the coded information 12 may comprise different alpha-numeric characters, graphics, symbols and the like, or combinations thereof, used for identification of cable 10.

Figure 3:
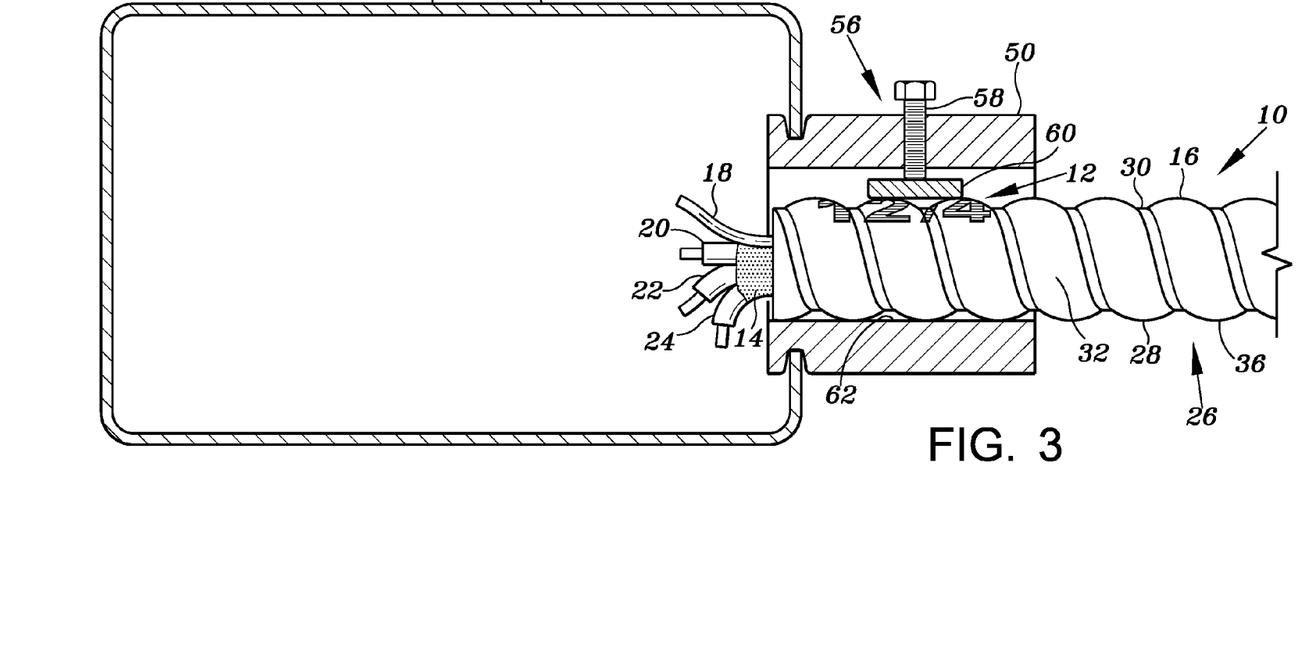
FIG. 3 is a section view of the metal-clad armored electrical cable of FIG. 1 secured to a termination box by a connector member.

As best illustrated in FIG. 3, coded information 12 is etched or otherwise formed directly in outer sheath 16 such that in the event cable 10 is terminated/cut over coded information 12, the coded information 12 will not prevent electrical connectivity and/or otherwise prevent a bonding path to exist between sheath 16 and an conductive connector member 50 when cable 10 is coupled to an enclosure 52, such as, for example, a junction or termination box 54. Referring specifically to FIG. 3, connector member 50 is used for securing cable 10 to metal termination box 54. In FIG. 3, connector member 50 includes a cable locking mechanism 56 having a metal screw 58 and a metal plate 60 for positioning cable 10 adjacent a wall 62 of connector 50 for securing cable 10 to termination box 54. Thus, connector member 50 makes electrical and mechanical contact with cable 10, and specifically sheath 16, via screw 58, plate 60 and wall 62 of connector 70 to provide uninterrupted electrical connectivity therebetween. Accordingly, in the event cable 10 is terminated over coded information 12 such that all or a portion of encoded information 12 is exposed on the terminated end of cable 10, coded information 12, by virtue of being etched directly in surface 32 and at a shallow depth, enables and/or otherwise maintains uninterrupted electrical connectivity between sheath 16 and connector 50 (via screw 58, plate 60 and connector wall 62) and thus termination box 54.

Preferably, coded information 12 is applied and/or otherwise formed in outer sheath 16 via a laser prior to storing cable 10 on a storage or take-up reel (not illustrated). The laser may comprise for example, a CO2 or Yag laser. According to embodiments described herein, the laser is positioned to etch coded information 12 once metal sheath 16 is applied or wrapped around conductors 18, 20, 22 and 24 and before cable 10 is stored on the take-up reel. However, it should be understood that the manufacture of cable 10 may be otherwise performed. For example, cable 10 may be stored on take-up reel without applying encoded information 12 thereon for subsequent etching thereon.

Figure 4:
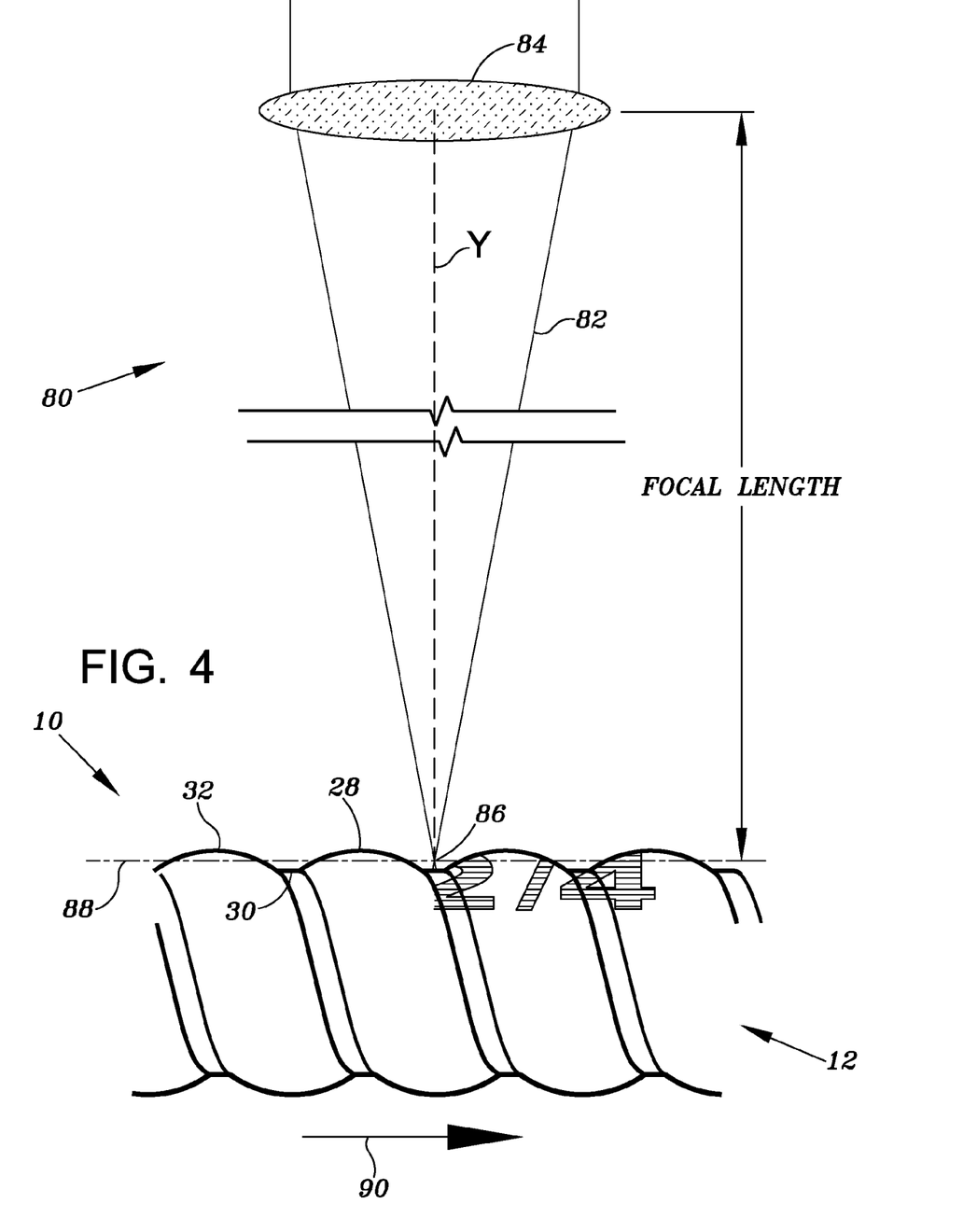
FIG. 4 is a diagram illustrating a portion of a laser printing apparatus for producing the coded information in the outer surface of the metal-clad cable of FIG. 1.
Figures 5, 6:
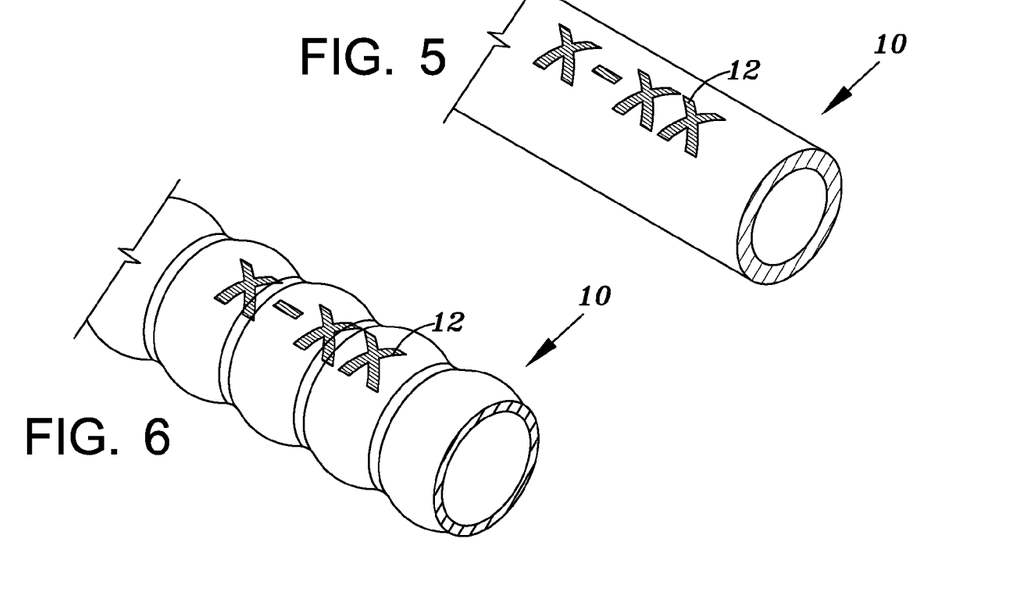
FIG. 5 is a diagram illustrating a metallic tubing having a smooth outer surface having coded information thereon.
FIG. 6 is a diagram illustrating a metallic tubing having a corrugated or non-smooth outer surface having coded information thereon.
Figure 7:
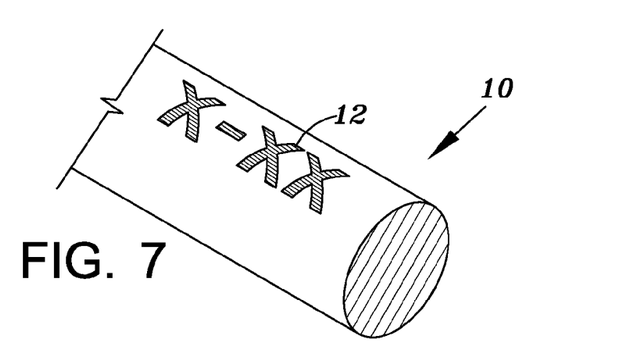
FIG. 7 is a diagram illustrating a conductor with coded information thereon.
Figure 8:
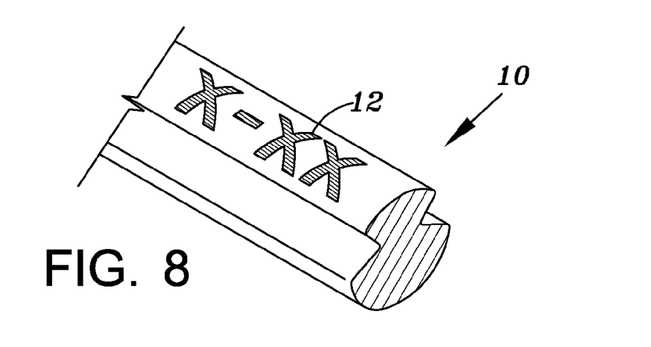
FIG. 8 is a diagram illustrating another embodiment of a conductor with coded information thereon.

Referring now to FIG. 4, a portion of a laser printing apparatus 80 is illustrated. In FIG. 4, a laser beam 82 is focused by a lens 84 along a focal axis Y so as to form a focal point 86 to etch and otherwise form coded information 12 on cable 10. In operation, cable 10 is fed into laser printing apparatus 80 such that the outer surface 32 of cable 10 is aligned with focal point 86 that extends a fixed focal length from lens 84. In particular, cable 10 is aligned such that an average surface midpoint of cable 10, defined by the midpoint between crowns 28 and valleys 30 as illustrated by midpoint axis 88, is aligned with and otherwise intersects focal point 86. Accordingly, when forming coded information 12 on cable 10, printing inaccuracies that result from the uneven surface/shape of surface 32 is minimized. For example, as cable 10 moves in the direction of arrow 90 and focal point 86 contacts surface 32, there is no laser spread and thus, accurate and clear printing results. However, as cable 10 continues to move in the direction of arrow 90 and crown 28 aligns with a focal axis Y, the laser contacts surface 32 at a distance shorter than the focal length thus resulting in less accurate and precise etching since the laser at that point has not yet converged to the focal point 86. Likewise, as cable 10 continues to move in the direction of arrow 90 and valley 30 is aligned with focal axis Y, the laser contacts surface 32 at a longer distance than the focal length thus resulting in less accurate and precise etching since the laser at that point has diverged from focal point 86. Accordingly, by aligning surface 32 of cable 10 such that the surface midpoint axis 88 is aligned with and intersects the focal point 86, more precise printing can be obtained across the entire length of encoded identifier thereby resulting in clear visibility.

While a single laser printing apparatus 80 is illustrated and described herein for forming coded information 12, it should be understood that a greater number of lasers can be utilized to facilitate a faster labeling process. For example, one laser can be configured to outline or trace the outer boundary of the encoded identifier while one or more additional lasers can be utilized to fill/hatch the interior area of coded information 12 to provide a clearly visible identifier in a shorter time-span.

In addition, it should be understood that the above-described method can be applied to any type of metallic tubing and/or metallic sheaths (smooth or corrugated), directly to corrugated or non-corrugated conductor wire having either a circular cross-sectional area or a non-circular cross-sectional area, such as for example, a trolley wire, all of which is illustrated, for example, in FIGS. 5-8, respectively.

Although specific embodiments have been described in detail, those skilled in the art will also recognize that various substitutions and modifications may be made without departing from the scope and spirit of the appended claims.

What is claimed is:

1. A metal-clad cable assembly, comprising:
    a metal sheath disposed around a conductor assembly, the metal sheath having spaced apart crowns and valleys; and
    one or more alpha-numeric character recessed areas, each alpha-numeric character recessed area continuously formed from a removed portion of an outer surface of the spaced apart crowns and valleys, the alpha-numeric character recessed areas providing at least one of a characteristic or intended application of the metal-clad cable assembly.

2. The metal-clad cable assembly of claim 1, further comprising a coating disposed on an outer surface of the metal sheath, the alpha-numeric character recessed areas formed within the coating.

3. The metal-clad cable assembly of claim 2, wherein the coating is conductive.

4. The metal-clad cable assembly of claim 2, wherein the coating comprises at least one of a stain, ink or paint.

5. The metal-clad cable assembly of claim 1, wherein the alpha-numeric character recessed areas are etched into the metal sheath.

6. The metal-clad cable assembly of claim 5, wherein the alpha-numeric character recessed areas comprise a powder coating to contrast the alpha-numeric character from the outer surface of the metal sheath.

7. The metal-clad cable assembly of claim 1, wherein the alpha-numeric character recessed areas are formed within the metal sheath along a longitudinal length and parallel to a longitudinal axis of the metal-clad cable assembly.

8. The metal-clad cable assembly of claim 1, wherein the alpha-numeric character recessed areas are formed at spaced apart intervals along a longitudinal length of the metal-clad cable assembly.

9. The metal-clad cable assembly of claim 1, wherein the metal sheath is interlocked.

10. The metal-clad cable assembly of claim 1, wherein the metal sheath is corrugated.

11. The metal-clad cable assembly of claim 1, wherein the conductor assembly comprises at least two conductors and a binder disposed around the at least two conductors.

12. The metal-clad cable assembly of claim 1, further comprising a bare grounding conductor disposed externally to the conductor assembly, the bare grounding conductor and metal sheath forming a low impedance ground path.

13. The metal-clad cable assembly of claim 1, wherein the one or more alpha-numeric character recessed areas extend to a depth within the outer sheath about 0.001 inches.

14. A method of manufacturing a metal-clad cable assembly comprising:
    wrapping a metal sheath around a conductor assembly, the metal sheath having a plurality of spaced apart crowns and valleys disposed along a longitudinal direction of the metal clad cable assembly; and
    forming continuously extending alpha-numeric character recessed areas in the metal sheath by removing at least a portion of the outer sheath along the plurality of spaced apart crowns and valleys, the alpha-numeric recessed areas providing at least one of a characteristic or intended application of the metal-clad cable assembly.

15. The method of claim 14, further comprising forming a coating on an outer surface of the metal sheath.

16. The method of claim 15, wherein forming the alpha-numeric character recessed areas comprises using a laser to burn the alpha-numeric character recessed areas into the coating and etch the alpha-numeric character recessed areas into the metal sheath.

17. The method of claim 16, further comprising forming a powder coating within the etching to contrast the alpha-numeric character recessed areas from the outer sheath.

18. The method of claim 14, wherein wrapping the metal sheath around the conductor assembly comprises providing an interlocking metal sheath.

19. The method of claim 14, wherein the wrapping the metal sheath around the conductor assembly comprises providing a corrugated metal sheath.

20. The method of claim 14, further comprising forming the conductor assembly by providing at least two conductors and a binder disposed around the at least two conductors.

21. The method of claim 20, further comprising providing a bare grounding conductor externally to the conductor assembly such that the bare grounding conductor and metal sheath form a ground path.

22. A metal-clad cable assembly, comprising:
   a metal sheath disposed around a conductor assembly, the metal sheath having spaced apart crowns and valleys;
   a coating material disposed on the outer surface of the metal sheath; and
   an alpha-numeric character recessed area continuously extending along a removed portion of an outer surface of the coating material on the spaced apart crowns and valleys, the alpha-numeric character recessed area providing at least one of a characteristic or intended application of the metal-clad cable assembly.

23. The metal-clad cable assembly of claim 22, wherein the coating material is conductive.

24. The metal-clad cable assembly of claim 22, wherein the coating material comprises at least one of a stain, ink or paint.

25. A metal-clad cable assembly, comprising:
   a metal sheath disposed around a conductor assembly, the metal sheath having spaced apart crowns and valleys; and
   one or more symbol recessed areas, each symbol recessed area continuously formed from a removed portion of an outer surface of the spaced apart crowns and valleys, the symbol recessed area providing at least one of a characteristic or intended application of the metal-clad cable assembly.

26. The metal-clad cable assembly of claim 25, wherein the symbol recessed area comprises an alpha-numeric character.

27. A metal-clad cable assembly, comprising:
   a metal sheath disposed around a conductor assembly, the metal sheath having spaced apart crowns and valleys; and
   one or more alpha-numeric character etched areas, at least a portion of each alpha-numeric character etched area continuously extending along an outer surface of the spaced apart crowns and valleys, the alpha-numeric character etched areas providing at least one of a characteristic or intended application of the metal-clad cable assembly.

* * * * *